United States Patent [19]

Gross et al.

[11] Patent Number: 4,972,471
[45] Date of Patent: Nov. 20, 1990

[54] ENCODING SYSTEM

[76] Inventors: Gary Gross, Apt. 203 2721 Victoria Pk. Ave., Agincourt, Ontario, Canada, M1T 3N6; James Dale, 65 Huntley St., Toronto, Canada, M44 2L2

[21] Appl. No.: 351,591

[22] Filed: May 15, 1989

[51] Int. Cl.$^5$ .......................................... G11B 23/28
[52] U.S. Cl. ........................................... 380/3; 380/5; 369/28; 360/72.1
[58] Field of Search ................... 380/3, 5; 360/5, 25, 360/49, 55, 60, 72.1, 72.2; 369/27, 28, 48, 49

[56] References Cited

U.S. PATENT DOCUMENTS

| | | | |
|---|---|---|---|
| 4,040,099 | 8/1977 | Cook | 380/5 |
| 4,086,634 | 4/1978 | Cook | 380/5 |
| 4,305,101 | 12/1981 | Yarbrough et al. | 360/60 |
| 4,528,588 | 7/1985 | Löfberg | 380/5 X |
| 4,802,212 | 1/1989 | Freeman et al. | 380/3 |
| 4,876,617 | 10/1989 | Best et al. | 360/60 |

*Primary Examiner*—Thomas H. Tarcza
*Assistant Examiner*—Tod Swann

[57] ABSTRACT

The method of encoding a given recorded signal made up of a host of different frequencies comprises modifying the recorded signal to selectively alter in a known manner a portion of the recorded signal to produce a machine recognizable start code which is generally unperceptible to human recognition when the recorded signal is played in its intended manner. The signal is scanned and immediately after the start code, an identity code is generated based on the particular signal characteristics which collectively are unique to the recorded signal and by means of which the recorded signal can be identified. A recorded signal which has been encoded in accordance with this method has a start code which can be machine recognized during playing of the recorded signal. This recognized start code locates a portion of the signal used to identify the same. Apparatus for carrying out this particular method, both in encoding of the recorded signal and scanning of signals which have been encoded, form part of the present invention. This invention is particularly useful for monitoring of broadcast signals having included therein material covered by copyright.

20 Claims, 1 Drawing Sheet

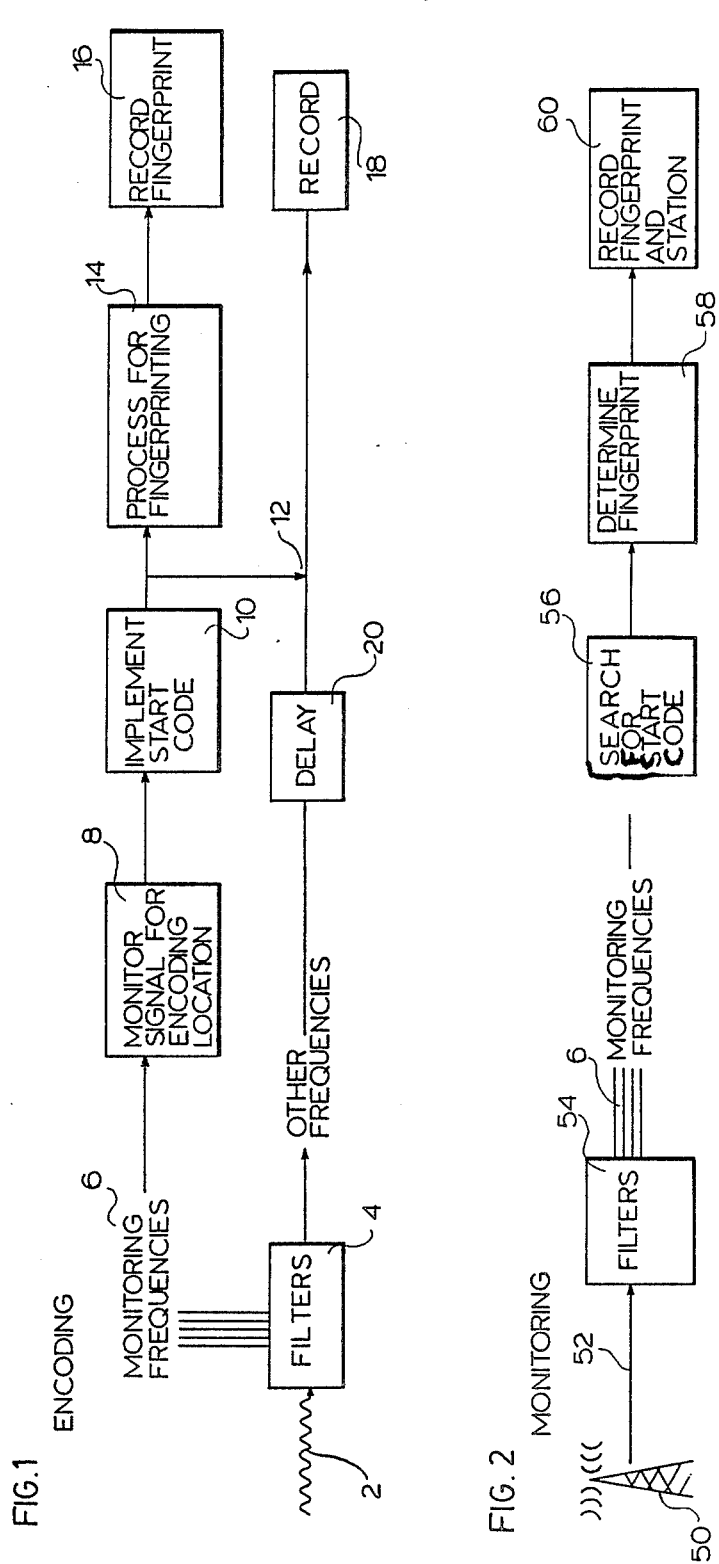

ENCODING SYSTEM

BACKGROUND OF THE INVENTION

The present invention relates to encoding of signals and in particular, encoding of signals which are intended to be played back.

A number of systems have been proposed to enable monitoring of electronic media, including radio and television, to uniquely identify various signals. Examples of such prior art systems can be found in U.S. Pat. No. 3,004,104 Hembrooke, U.S. Pat. No. 4,040,099 Cook, U.S. Pat. No. 4,074,311 Tanner, U.S. Pat. No. 4,086,634 Cook, and U.S. Pat. No. 4,213,149 Janko.

These patents generally alter a recorded signal to prevent later unauthorized copying of it without affecting the signal when it is played back in the usual manner. In U.S. Pat. No. 3,004,104, there is disclosure of modifying a signal by varying a particular narrow frequency band for varying periods of time to introduce into the signal a particular code which uniquely identifies the product.

The addition of a particular signal to a recorded signal for the purpose of identifying the recorded signal or the selective deletion of the signal to allow identification of the signal is difficult and causes problems with respect to recognition of the particular recorded signal. These recorded signals are each unique and the signals must be modified in a manner that does not affect the intended quality of the signal. In addition to the huge number of recorded signals which require encoding, a problem occurs in being able to determine where the particular code starts and thus, to date, no systems have been effectively used in the marketplace to applicant's knowledge. With current technology, large computer memory banks may make some systems more feasible, however, there remains a need to provide a simple, efficient solution by which a signal may first be encoded and subsequently, when replayed, will allow convenient recognition without significantly affecting the quality of the signal and certainly without affecting the quality of the recorded signal in its entirety.

SUMMARY OF THE INVENTION

According to the present invention, a method of encoding a given recorded signal made up of a host of frequencies comprises modifying the recorded signal to selectively alter in a known manner a portion of the recorded signal to produce a machine recognizable start code which is generally unperceptible to normal human recognition when the recorded signal is played in its intended manner. The encoded signal is analyzed after the start code to generate an identity code based upon particular signal characteristics which collectively are unique to the recorded signal and by means of which the recorded signal can be identified.

According to an aspect of the invention, at least one frequency band is encoded.

According to a preferred embodiment of the invention, the recorded signal is modified by first filtering the signal to produce one or more monitoring frequencies, with these monitoring frequencies modified by deleting portions of the frequencies to produce a digital start code. After the start code, the signal within each of the monitored frequencies is digitized and used in combination with known pattern recognition evaluation software to provide a unique identity code for the recorded signal.

In encoding of the recorded signal, the signal is preferably scanned to assure that the portion of the signal which will receive the start code and which will be used for pattern recognition of the recorded signal has a signal of sufficient strength within the monitored frequencies. Preferably some five frequencies are used as monitoring frequencies, however, a full signal is not required within each of the monitoring frequencies. By selecting the monitoring frequencies appropriately, there will be no appreciable manner to recognize the deletion of part of these monitoring frequencies, as it occurs at a rate which is generally unperceptible to the human ear. In addition, the remaining portion of the recorded signal will serve to mask the deletion of the signal, thus further burying the start code within the signal such that it is generally unrecognizable. Once the signal has been properly encoded, it is then possible to set up an overall monitoring system which samples a number of broadcasts and recognizes the particular start code after which the signal is analyzed for pattern recognition. In this way, a full monitoring system of recorded signals is provided as well as a simple method of initially introducing the start code to the recorded signal.

It is often desirable to limit the reproduction of an encoded recorded signal and any duplicating device can be provided with circuitry which, upon recognition of the start code, disenables the apparatus with respect to reproducing of the signal. In this way, protection can also be achieved for the unauthorized copying of copyrighted signals.

BRIEF DESCRIPTION OF THE DRAWINGS

Preferred embodiments of the invention are shown in the drawings, wherein:

FIG. 1 is a schematic of the encoding process; and

FIG. 2 is a schematic of the monitoring process of the present invention.

DETAILED DESCRIPTION OF THE PREFERRED EMBODIMENT

The preferred embodiment will be described with respect to encoding and monitoring of an audio received signal. However, it is possible to use the method and apparatus for other signals having a host of frequencies where a very limited amount of one or certain frequencies may be eliminated in a particular manner to provide a start code. Thereafter, one or certain frequencies are used as an input for pattern recognition evaluation software to arrive at a unique fingerprint for the particular signal. In this way, only a portion of the signal is used and equipment can continuously monitor for the start code.

The schematic in FIG. 1 gives an overall view of the method of encoding. The audio signal 2 is processed through a filter 4 and certain scanning frequencies 6 are separated from the signal for separate processing. The scanning frequencies 6 first undergo a review 8 to locate a proper location within the signal to be encoded by placing of a start code. The particular placement of the start code is dependent upon the strength of the various frequencies, as the start code will be introduced into one or more of the frequencies.

During the original recording of an audio signal, it is customary to have a location code associated therewith and this is normally the SMPTE code associated with the audio signal. Once an appropriate location within the signal is determined, the audio signal is replayed and at the appropriate location, the start code is introduced by means of a device 10 for introducing the start code. Basically, this implementation of the start code is generated by intermittently blanking or punching out time slices of the audio signal. In particular, only narrow band frequencies are punched out, these being the scanning frequencies. The encoded start signal is preferably introduced where there is sufficient energy and surrounding frequencies to take advantage of the masking properties of the human ear. Basically, if a strong frequency is close to the frequency that has been punched out, the human ear generally averages the two and is not able to pick up the blanked out interval. This is very effective when the duration of the pulses are short. As can be appreciated, the equipment can be such that, due to the filtering, this blank can be readily determined. Thus, there is existing equipment which is sufficiently sensitive to be able to determine when the portion of the signal has been blanked or punched out which cannot be determined by the human ear, particularly where the surrounding frequencies are of sufficient strength.

Various arrangements are possible for implementing the start code which is a digital start sequence, preferably an 8 bit word encoded into each of the frequencies at a rate of 33 bits per second. Once the start code has been introduced into the signal, the scanning frequencies again return to the signal generally at position 12, such that the entire signal is now encoded and is suitable for recording. Any reproducing of the signal using conventional techniques will result in the start code also being part of the recorded signal.

In order to provide positive recognition of the signal, it has been found that the punching or blanking out, even in multiple frequencies, is not suitable for identification purposes. However, by analyzing a portion of one or more of these frequencies immediately after the start code using an identity code algorithm which is based on the digitized relative amplitude of the sample signals over time within the particular monitoring frequencies, a "fingerprint" of the signal can be generated. This digitizing of the signal is generally carried out at 14 and provides a recognizable fingerprint indicated as 16 in the schematic. Thus, in recording of the signal, a "fingerprint" is generated, a start code is introduced into the audio signal, and the signal is recorded generally at 18.

The above encoding system allows effective placement of the start code within the particular coded signal at any point within the signal, thus making it difficult (a) to determine where the start code is, and (b) to delete the start code.

The processing of the scanning frequencies introduces a certain fixed delay which is compensated for by delaying of the other frequencies at device 20.

FIG. 2 generally shows the monitoring of signals at a central source 50 used to monitor a host of received signals, such as those from various radio stations, in a manner to allow separate identification of such radio stations and any "fingerprint" signals. These received signals are each processed, as indicated by 52, by passing the same through filters 54 to produce, again, the scanning frequencies 6. Once these frequencies have been separated from the signal, the equipment indicated as 56 will search for the start code and upon determination of a start code, will then process the signal further as indicated at 58 to reestablish the fingerprint already assigned to the signal, as indicated as 16 in FIG. 1. Determination of the fingerprint will be recorded in combination with the particulars of the received signal to provide whatever desired information is required, with this process being carried out generally at location 60. The monitoring can only extract the fingerprinted signal or preferably will actually compare the reestablished fingerprint to stored fingerprints to establish the appropriate party.

From the above, it can be recognized that monitoring is continuous and the encoded input analog signal is processed, as indicated in FIG. 2, to continuously scan for the coded digital start sequence. Once the sequence is found, the decoder measures particular signal characteristics and generates the identity code according to a predetermined algorithm. As indicated in FIG. 1, encoding of the signal inserts the digital start sequence into the audio signal and generates the reference fingerprint or identity code.

The method of introducing the start code into the audio signal only uses certain frequencies of the overall signal to reduce the possibility of human recognition while providing convenient and accurate machine recognition. In addition to the above, the ability to recognize the start code has further been reduced by minimizing or reducing the band width of the frequencies to be processed, by reducing the time slice or duration of the blank portion of the signal, by reducing the number of bits within the start sequence, and by encoding the signal only when there is sufficient energy in surrounding frequencies to take advantage of the masking properties of the human ear. This last step is possible due to the scanning of the signal to determine the appropriate location freely within the signal rather than predetermining the location of the start code arbitrarily. Thus, this system allows customizing of the location of the start code such that the start code is not normally humanly recognizable when the recorded signal is played in its intended manner.

The property of masking is such that when there is energy of different amplitudes within two close together frequency bands, the higher amplitude signal will partially mask out the lower amplitude signal. To take advantage of this, the start sequence is put into the lower amplitude signal and hence, is masked by the higher amplitude signal.

Encoding is preferably performed as a two pass operation. In the first pass of the audio signal through the encoder, the encoder scans the signal for the optimum frequencies and time at which to encode the digital start sequence. The characteristics which determine the optimum frequencies or a preferred frequency and time are (1) there must be sufficient energy within the frequency band for the blank time slices to be easily discernible by the decoder, and (2) the frequency must be sufficiently masked during the encoding period. It is not necessary to introduce the start code into all frequencies. However, it may be desirable to encode more than one frequency to allow confirmation of a recognized start code during monitoring. This reduces detection of false start codes.

The frequency and time information is stored in the encoder memory for use during the second pass of the signal. The time is read off the SMPTE time clock which runs parallel to audio signal. During the second pass of the audio signal, the encoder actually performs the encoding of the digital start code sequence. By analyzing the five seconds of the signal immediately following the last bit of the digital start sequence or a different suitable duration, the encoder generates an identity code or fingerprint for the signal according to an algorithm. This identity code, which is unique to the particular audio signal, can then be matched against decoder output codes to identify the signal.

The following frequencies are components of the diatonic scale:

| | |
|---|---|
| 524 | 784 |
| 555 | 831 |
| 587 | 880 |
| 622 | 880 |
| 659 | 932 |
| 698 | 988 |
| 740 | |

Therefore, any music using the diatonic scale will have a minimum of one of these frequencies and typically will contain at least two frequencies.

It has been found that the following frequencies are sufficient for most music based on the diatonic scale:

| | |
|---|---|
| f1 | 524 Hz |
| f2 | 622 Hz |
| f3 | 880 Hz |
| f4 | 1109 Hz |
| f5 | 1397 Hz |

The band width is equal to 9.6% of the frequency.

The above frequencies of the diatonic scale and any harmonies thereof are preferred for encoding purposes.

As can be appreciated from the above, a simple arrangement for introducing a start code in an appropriate location within the signal is used in combination with a short duration preferably of approximately 5 seconds used to develop a unique identity code based on signal characteristics following the start code.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of encoding a given recorded signal made up of a host of frequencies, comprising:
    modifying the recorded signal to selectively alter in a known manner a portion of said recorded signal to produce a machine recognizable start code which is generally imperceptible to normal human recognition when the recorded signal is played in its intended manner and analyzing said signal after said start code to generate an identity code based upon particular signal characteristics which collectively are unique to the original recorded signal and by means of which the recorded signal can be identified.

2. A method as claimed in claim 1, wherein said start code is a digital signal produced by intermittently blanking out at least one selected frequency for short durations to produce a digital start code.

3. A method as claimed in claim 2, wherein the signal is an audio signal and said start code is provided in at least two different frequencies.

4. A method as claimed in claim 1, 2 or 3, wherein the recorded signal is an audio signal and said start code is only incorporated in the recorded signal when there is sufficient energy in the surrounding frequencies to mask the start code from perception by the human ear.

5. A method as claimed in claim 1, 2 or 3, including initially scanning said recorded signal for an appropriate signal portion into which the start code may be introduced and noting the location information of the appropriate signal portion, and thereafter by means of the information introducing the start code into the appropriate signal portion.

6. A method as claimed in claim 1, 2 or 3, wherein said start code is encoded in a portion of the signal less than 1 second in length.

7. A method as claimed in claim 1, 2 or 3, including scanning said recorded signal for an appropriate signal portion into which the start code may be introduced, noting location information of the appropriate signal portion and subsequently, by means of the location information, introduce the start code into the appropriate signal portion, and wherein said start code is at least an 8 bit word.

8. A method as claimed in claim 1, 2 or 3, including scanning said recorded signal for an appropriate signal portion into which the start code may be introduced, noting location information of the appropriate signal portion and subsequently, by means of the location information, introduce the start code into the appropriate signal portion, and wherein said start code is at least an 8 bit word encoded at about 33 bits per second.

9. A method as claimed in claim 1, 2 or 3, wherein said step of modifying the recorded signal can occur in at least one of five different preselected encoding frequencies which are components of the diatonic scale.

10. A method as claimed in claim 1, 2 or 3, wherein said step of modifying the recorded signal can occur in at least one of five different preselected encoding frequencies, and wherein the five different encoding frequencies are generally 524 Hz, 622 Hz, 1109 Hz, 1760 Hz, and 1397 Hz.

11. A method as claimed in claim 1, 2 or 3, wherein said step of modifying the recorded signal occurs in a frequency or harmonic of a frequency of the diatonic scale.

12. An encoder for encoding of a recorded audio signal, comprising:
    scanning means for scanning said recorded signal and determining therefrom a preferred location within the recorded signal for introducing a start code into the signal;
    means for noting information of the preferred location to allow the subsequent step of introducing the start code;
    means for using the information to return to the preferred location and introducing the start code;
    means for processing the signal in accordance with the start code and an algorithm for processing of the undisturbed recorded audio signal following the start code to produce an identity code unique to the recorded audio signal, and
    means for recording of the unique identity code.

13. An encoder as claimed in claim 12, wherein said monitoring means includes frequency filtering means used to process said audio signal by processing particular frequencies of the audio signal into which the start code is introduced.

14. An encoder as claimed in claim 13, wherein said filtering means is also used by said means for processing the signal whereby the identity code is derived from particular frequencies of the recorded audio signal.

15. An encoder as claimed in claim 13, wherein the start code is introduced into at least two separate and distinct frequencies.

16. An encoder as claimed in claim 15, wherein said frequency filtering means processes at least five separate and distinct frequencies of said audio signal selected from a frequency or harmonic of a frequency of the diatonic scale.

17. A monitoring system comprising:

means for receiving, from a predetermined source, a signal coded with a start code and followed with a signal portion which has not been coded and means for processing of the received signal to determine if a predetermined start code is provided in said received signal and means for subsequent processing of said following uncoded portion of said received signal upon recognition of a start code by using pattern recognition processing based upon said following portion to extract an identity code from the received signal based upon the characteristics of the signal following the start code, and means for recording of the identity code.

18. A monitoring system as claimed in claim 17, wherein said means for processing of the received signal filters the signal into a number of monitoring frequencies which are monitored for the start code and which are used for pattern recognition processing.

19. A monitoring system as claimed in claim 18, including computer means for comparing the identity code with known identity codes for credit allocation.

20. A monitoring system as claimed in claim 19, wherein at least five monitoring frequencies are used and said monitoring system is for radio signals.

* * * * *